United States Patent
Lee et al.

(10) Patent No.: US 8,518,593 B2
(45) Date of Patent: Aug. 27, 2013

(54) METHOD FOR CONTROLLING OPERATION OF FUEL CELL AT LOW TEMPERATURE

(75) Inventors: Dong Hun Lee, Gyeonggi-do (KR); Seo Ho Choi, Seoul (KR); Sun Soon Park, Gyeonggi-do (KR); Myoung Ho Sunwoo, Gyeonggi-do (KR); Jung Hwan Ryu, Seoul (KR); Keon Yup Chu, Seoul (KR); Ki Chun Jo, Seoul (KR)

(73) Assignees: Hyundai Motor Company, Seoul (KR); Industry-University Cooperation Foundation Hanyang University, Seoul (KR)

( * ) Notice: Subject to any disclaimer, the term of this patent is extended or adjusted under 35 U.S.C. 154(b) by 454 days.

(21) Appl. No.: 12/795,176

(22) Filed: Jun. 7, 2010

(65) Prior Publication Data

US 2011/0070515 A1    Mar. 24, 2011

(30) Foreign Application Priority Data

Sep. 22, 2009 (KR) .................... 10-2009-0089395

(51) Int. Cl.
*H01M 8/04* (2006.01)
*H01M 8/06* (2006.01)

(52) U.S. Cl.
USPC ............ 429/442; 429/413; 429/431; 429/432

(58) Field of Classification Search
USPC ................. 429/400, 413, 414, 428, 429, 430, 429/442, 450, 431
See application file for complete search history.

(56) References Cited

U.S. PATENT DOCUMENTS

2006/0263652 A1    11/2006    Logan

FOREIGN PATENT DOCUMENTS

| JP | 2004-146240 A | 5/2004 |
| JP | 2007-122911 A | 5/2007 |
| KR | 10-0529452 | 7/2003 |
| KR | 10-2009-0063838 | 6/2009 |

*Primary Examiner* — Ula C. Ruddock
*Assistant Examiner* — Thomas H. Parsons
(74) *Attorney, Agent, or Firm* — Edwards Wildman Palmer LLP; Peter F. Corless (57) ABSTRACT

The present invention provides a method for controlling the operation of a fuel cell system at low temperature that can suitably prevent flooding in a cathode of a fuel cell stack during low-temperature operation, thus improving the operation stability and durability of the fuel cell stack. In preferred embodiments, the present invention provides a method for controlling the operation of a fuel cell system at low temperature, the method comprising determining whether the temperature of a fuel cell stack reaches a normal temperature; calculating, when it is determined that the temperature of the fuel cell stack is lower than the normal temperature, a target temperature at a cathode outlet to maintain water present in a cathode of the fuel cell stack in a vapor phase based on information related to an operation state of the fuel cell stack detected by an operation state detection means; and calculating a target amount of coolant based on the calculated target temperature at the cathode outlet and the information related to the operation state of the fuel cell stack, and controlling the amount of coolant supplied to the fuel cell stack based on the calculated target amount of coolant.

12 Claims, 6 Drawing Sheets

METHOD FOR CONTROLLING OPERATION OF FUEL CELL AT LOW TEMPERATURE

CROSS-REFERENCE TO RELATED APPLICATION

This application claims under 35 U.S.C. §119(a) the benefit of Korean Patent Application No. 10-2009-0089395 filed Sep. 22, 2009, the entire contents of which are incorporated herein by reference.

BACKGROUND (a) Technical Field

The present disclosure relates, generally, to a fuel cell system applied to a vehicle. More particularly, it relates to a method for controlling the operation of a fuel cell system, which can prevent flooding in a cathode of a fuel cell stack during the operation of the fuel cell stack at low temperature.

(b) Background Art

One of the most attractive fuel cells for a vehicle is a polymer electrolyte membrane fuel cell (PEMFC), which comprises a membrane electrode assembly (MEA), a gas diffusion layer (GDL), a gasket, a sealing member, and a bipolar plate. The MEA preferably includes a polymer electrolyte membrane through which hydrogen ions are suitably transported. An electrode/catalyst layer, in which an electrochemical reaction takes place, is suitably disposed on each of both sides of the polymer electrolyte membrane. Preferably, the GDL functions to uniformly diffuse reactant gases and transmit generated electricity. Preferably, the gasket functions to provide an appropriate airtightness to reactant gases and coolant. Preferably, the sealing member functions to provide an appropriate bonding pressure. Preferably, the bipolar plate functions to support the MEA and GDL, collect and transmit generated electricity, transmit reactant gases, transmit and remove reaction products, and transmit coolant to remove reaction heat, etc.

The fuel cell stack preferably consists of a plurality of unit cells, each unit cells including an anode, a cathode and an electrolyte (electrolyte membrane). Hydrogen is supplied to the anode ("fuel electrode", "hydrogen electrode" or "oxidation electrode") and oxygen-containing air is supplied to the cathode ("air electrode", "oxygen electrode" or "reduction electrode").

Preferably, the hydrogen supplied to the anode is dissociated into hydrogen ions (protons, $H^+$) and electrons ($e^-$) by a catalyst disposed in the electrode/catalyst layer. The hydrogen ions are transmitted to the cathode through the electrolyte membrane, which is a cation exchange membrane, and the electrons are transmitted to the cathode through the GDL and the bipolar plate.

At the cathode, the hydrogen ions supplied through the (polymer) electrolyte membrane and the electrons transmitted through the bipolar plate react with the oxygen-containing air supplied to the cathode to produce water. Accordingly, migration of the hydrogen ions causes electrons to flow through an external conducting wire, which generates electricity and heat.

In the PEMFC system applied to a vehicle, the temperature of the fuel cell stack is low before the temperature of the fuel cell system reaches an optimal temperature (normal temperature above a predetermined temperature) after start-up, and thus the amount of water condensed in a cathode channel is increased, which can cause various problems such as flooding due to the water condensation.

Further, when the amount of condensed water or product water is suitably increased in the fuel cell stack, this water remains in the fuel cell stack together with water condensed after shutdown of the fuel cell system, and as a result, the condensed water freezes at a temperature below the freezing point during the winter season, which makes it impossible to perform a cold start.

Accordingly, it is necessary to provide a method to suitably minimize the production of condensed water in the cathode channel, thereby preventing flooding in the fuel cell stack, and improving the operation stability and durability of the fuel cell stack, and ensuring the startability even when the vehicle is shut down at a temperature below the freezing point or cold started thereafter.

Conventionally, a method of increasing the temperature of the fuel cell stack by consuming the current of the fuel cell stack using loads connected in parallel to the fuel cell stack is employed.

However, although this method has the advantage that the temperature of the fuel cell stack can be suitably increased within a short period of time, the energy generated from the fuel cell stack is all consumed as heat energy, which suitably reduces the energy efficiency. Moreover, this method has its limitations in preventing water condensation and flooding in the cathode channel.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention features a method for controlling the operation of a fuel cell system at low temperature, which can effectively prevent flooding in a cathode of a fuel cell stack during low-temperature operation, thus suitably improving the operation stability and durability of the fuel cell stack. In preferred embodiments, the method of the present invention can suitably increase the output power of the fuel cell stack by increasing the average operation temperature during the low-temperature operation and suitably ensure the cold startability during the winter season by reducing the amount of water condensed in a cathode channel.

In a preferred embodiment, the present invention provides a method for controlling the operation of a fuel cell system at low temperature, the method preferably including determining whether the temperature of a fuel cell stack reaches a normal temperature; calculating, when it is determined that the temperature of the fuel cell stack is lower than the normal temperature, a target temperature at a cathode outlet to maintain water present in a cathode of the fuel cell stack in a vapor phase based on information related to an operation state of the fuel cell stack detected by an operation state detection means; and suitably calculating a target amount of coolant based on the calculated target temperature at the cathode outlet and the information related to the operation state of the fuel cell stack, and controlling the amount of coolant supplied to the fuel cell stack based on the calculated target amount of coolant.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Reference numerals set forth in the Drawings includes reference to the following elements as further discussed below:

100: fuel cell stack 210: hydrogen supply system
220: air supply system 230 water supply system
300: controller It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

According to preferred aspects, the present invention features a method for controlling the operation of a fuel cell system at low temperature, the method comprising determining the temperature of a fuel cell stack, calculating a target temperature at a cathode outlet to maintain water present in a cathode of the fuel cell stack in a vapor phase based on information comprising an operation state of the fuel cell stack, and calculating a target amount of coolant based on the calculated target temperature at the cathode outlet and the information related to the operation state of the fuel cell stack, and controlling the amount of coolant supplied to the fuel cell stack based on the calculated target amount of coolant.

In one embodiment, the step of determining the temperature comprises determining whether the temperature of a fuel cell stack reaches a normal temperature.

In another embodiment, the calculating is performed when it is determined that the temperature of the fuel cell stack is lower than the normal temperature.

In another further embodiment, information comprising an operation state of the fuel cell stack is detected by an operation state detection means.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

According to preferred embodiments as described herein, the present invention aims at providing methods for controlling the operation of a fuel cell system at low temperature, which can suitably prevent water condensation in a cathode and increase the average operation temperature of a fuel cell stack in such a manner to suitably maintain the relative humidity in a cathode channel at 100% by controlling the amount of coolant circulated through the fuel cell stack such that a temperature difference between cathode inlet and outlet of the fuel cell stack is at an appropriate level before the temperature of the fuel cell stack reaches a normal temperature after start-up of the fuel cell system, thereby suitably improving the output performance of the fuel cell system.

Figure 1:
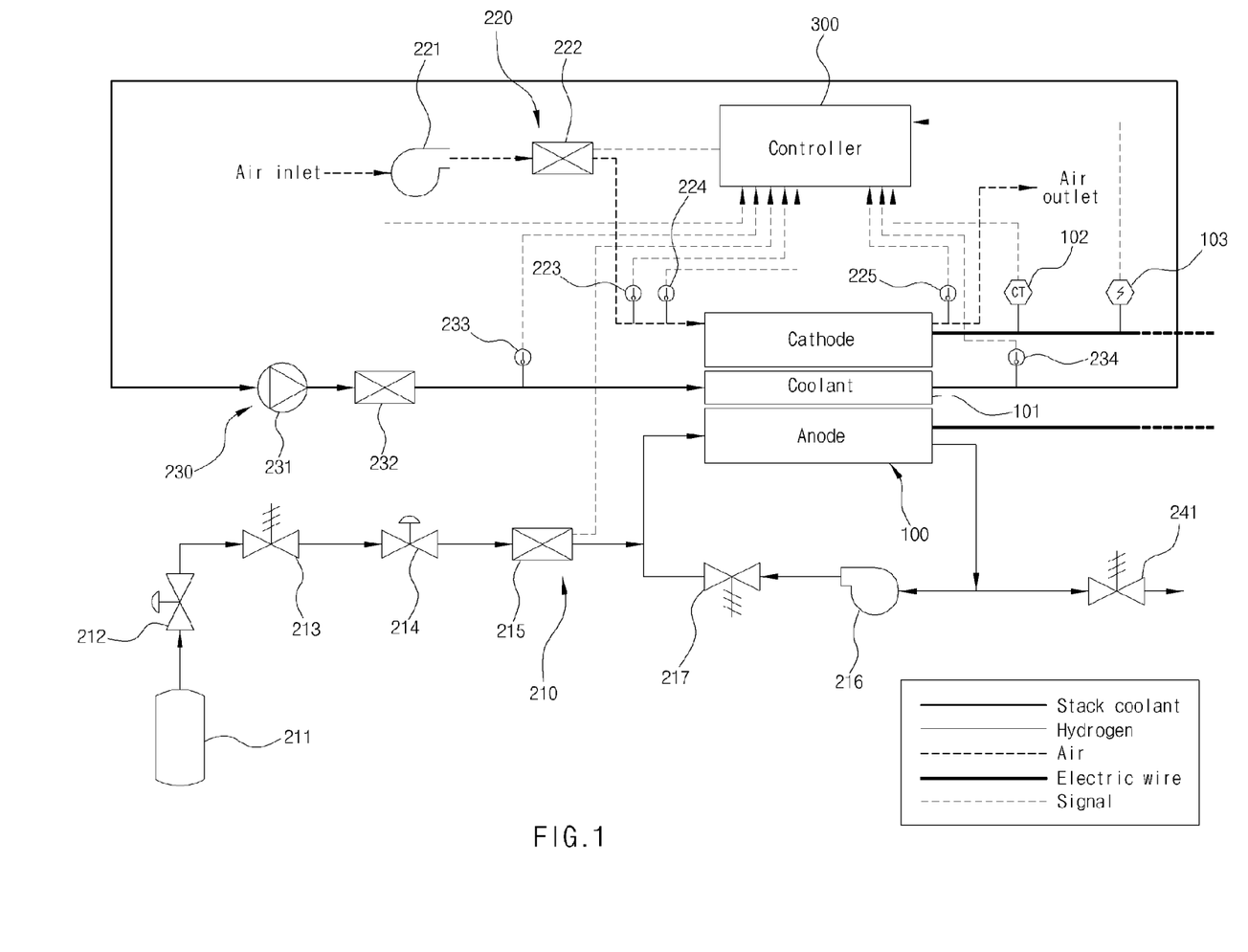
FIG. 1 is a configuration diagram of a fuel cell system to which a method for controlling the operation of a fuel cell system at low temperature in accordance with a preferred embodiment of the present invention is applicable.

According to certain preferred embodiments of the present invention and as shown in FIG. 1, for example, FIG. 1 is a configuration diagram of a fuel cell system to which a method for controlling the operation of a fuel cell system at low temperature in accordance with a preferred embodiment of the present invention is applicable. As shown in FIG. 1, for example, the fuel cell system preferably includes a fuel cell stack 100, which generates electrical energy by an electrochemical reaction between reactant gases (hydrogen and oxygen in the air), a hydrogen supply system 210, which supplies hydrogen, an air supply system 220, which supplies air, and a water supply system 230, which circulates coolant through the fuel cell stack.

Preferably, the hydrogen supply system 210 includes a hydrogen tank 211, a hydrogen supply valve (start/stop solenoid valve) 213, high-pressure and low-pressure regulators 212 and 214, and a flowmeter 215, which are suitably installed in a hydrogen supply line, and a hydrogen recirculation blower 216 and a recirculation valve (solenoid valve) 217, which are suitably installed in a hydrogen recirculation line. The air supply system 220 includes an air blower 221 and a flowmeter 222, which are installed in an air supply line.

In further preferred embodiments, in the hydrogen supply system 210, the high-pressure hydrogen of the hydrogen tank 211 sequentially passes through the high-pressure and low-pressure regulators 212 and 214 such that the hydrogen pressure is suitably regulated, and the pressure-regulated hydrogen is suitably supplied to an anode of the fuel cell stack 100.

According to other further preferred embodiments, the hydrogen recirculation blower 216 and the recirculation valve 217 are suitably provided at an anode outlet of the fuel cell stack 100 to recirculate unreacted hydrogen of the anode remaining after reaction to the anode by operating the hydrogen recirculation blower 216 in a state that the recirculation valve 217 is suitably opened during the operation of the fuel cell system, thus recycling the hydrogen.

According to still other further preferred embodiments, in the air supply system 220, the air supplied by the air blower 221 is suitably supplied to a cathode of the fuel cell stack 100 via the flowmeter 222, and a hydrogen purge valve (purge solenoid valve) 241 is suitably provided at the anode outlet of the fuel cell stack 100 to discharge foreign substances such as nitrogen and water accumulated in the anode.

According to further preferred embodiments of the present invention, the water supply system 230 preferably includes a water pump 231 and a flowmeter 232, which are installed in a coolant circulation line, such that the water pump 231 suitably supplies coolant through a coolant channel 101 of the fuel cell stack 100.

Preferably, the fuel cell system further includes an operation state detection means for detecting an operation state of the fuel cell stack 100, the operation state detection means including temperature sensors, pressure sensors, a current sensor, a voltage sensor, a flowmeter, etc.

Accordingly, in further preferred embodiments of the present invention, temperature sensors 233 and 234 are suitably installed in the coolant circulation line to detect the temperature at coolant inlet and outlet of the fuel cell stack 100, and a temperature sensor 223 is installed in the air supply line to suitably detect the temperature at the cathode inlet of the fuel cell stack 100. Preferably, a pressure sensor 224 is suitably installed at the cathode inlet of the fuel cell stack 100 to detect the temperature at the cathode inlet, and a pressure sensor 225 is installed at the cathode outlet of the fuel cell stack 100 to detect the temperature at the cathode outlet.

In further preferred embodiments of the present invention, a current sensor 102 for detecting the current of the fuel cell stack 100 and a voltage sensor 103 for detecting the voltage of the fuel cell stack 100 are provided, and the flowmeter 222 is installed in the air supply line to suitably detect the amount of air supplied to the cathode of the fuel cell stack 100.

According to further preferred embodiments, for example as shown in FIG. 1, a controller 300 suitably controls the amount of coolant supplied to the fuel cell stack 100 based on information related to the operation state of the fuel cell stack detected by the operation state detection means.

A method for controlling the operation of the fuel cell system at low temperature having the above-described configuration in accordance with preferred embodiments of the present invention is described in detail, in which the controller 300 for controlling the amount of coolant supplied to the fuel cell stack 100 in response to a signal of the operation state detection means suitably controls the overall operation of the fuel cell system.

According to preferred embodiments, the present invention provides a method for preventing flooding in the cathode channel of the fuel cell stack by suitably controlling the amount of coolant circulated through the fuel cell stack such that a temperature difference between cathode inlet and outlet of the fuel cell stack is suitably maintained at an appropriate level, wherein as a results, the condensed water at the cathode channel is suitably controlled, before the fuel cell stack reaches a normal temperature after start-up of the fuel cell system, thereby improving the output performance of the fuel cell system.

Figure 2:
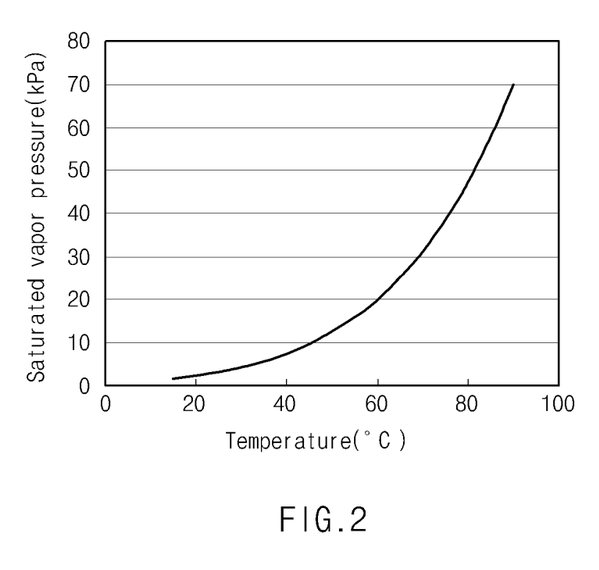
FIG. 2 is a graph showing a saturated vapor pressure curve.

According to preferred embodiments of the present invention, for example as shown in FIG. 2, since the saturated vapor pressure of water increases rapidly as the temperature increases, if the temperature difference between the cathode inlet and outlet becomes larger, the water produced in the cathode by the electrochemical reaction may be present in the vapor phase.

Accordingly, in preferred embodiments, the present invention is directed to providing a method for controlling the operation of a fuel cell system at low temperature, which suitably calculates a target temperature at the cathode outlet, which is used to maintain the humidity in the cathode outlet at 100%, based on a model that estimates the amount of heat generated from the fuel cell stack and suitably calculates the amount of water generated from the cathode of the fuel cell stack by the electrochemical reaction, and suitably maintains the temperature of the cathode outlet at the thus calculated target temperature by controlling the amount of coolant circulated through the fuel cell stack.

In general, since the heat capacity of water is very high, the temperatures of coolant and reactant gases are similar to each other. Accordingly, it is possible to control the temperature of the cathode gas by controlling the amount of coolant circulated through the fuel cell stack.

Figure 3:
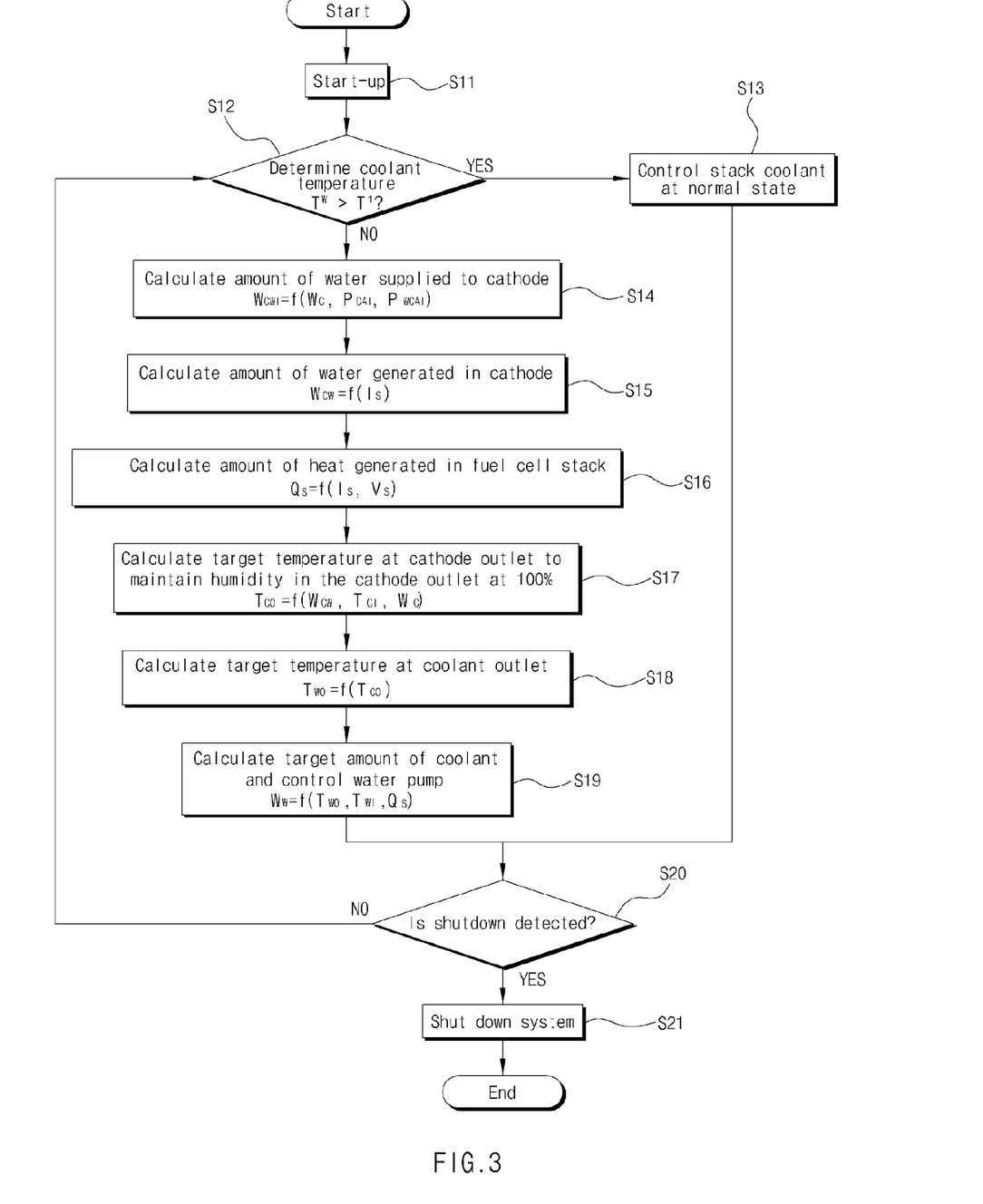
FIG. 3 is a flowchart illustrating a method for controlling the operation of a fuel cell system at low temperature in accordance with a preferred embodiment of the present invention.

According to certain preferred embodiments of the present invention and as shown in FIG. 3, FIG. 3 is a flowchart illustrating a method for controlling the operation of a fuel cell system at low temperature.

Preferably, when the fuel cell system is started (S11), the controller 300 determines whether the temperature of the fuel cell stack 100 reaches a normal temperature from a coolant temperature $T_w$ detected by the temperature sensor 234 (S12).

Preferably, when the coolant temperature $T_w$ is below a predetermined reference temperature $T_1$, it is determined that the fuel cell stack 100 is operated at a low temperature, and accordingly the control of the operation of the fuel cell system at low temperature in accordance with the present invention is suitably performed.

In other further embodiments of the present invention, when the coolant temperature $T_w$ is above the reference temperature $T_1$, it is preferably determined that the fuel cell stack 100 is suitably operated at a normal temperature, and thereby the control of coolant flow (e.g., the control the operation of the water pump) is suitably performed (S13).

Preferably, when it is determined that the fuel cell stack 100 is operated at a low temperature (low-temperature operation), the controller 300 suitably calculates the amount of water $W_{CWI}$ supplied to the cathode of the fuel cell stack 100 (S14), which corresponds to the amount of water contained in the air supplied to the cathode of the fuel cell stack 100. Preferably, the amount of water $W_{CWI}$ supplied to the cathode can be calculated using a cathode gas flow rate $W_C$ (i.e., the amount of air supplied to the cathode) detected by the flowmeter 222, a cathode inlet pressure $P_{CAI}$ detected by the pressure sensor 224, and a water partial pressure $P_{WCAI}$ at the cathode inlet. Preferably, the amount of water $W_{CWI}$ supplied to the cathode is used to suitably calculate the amount of water discharged from the cathode outlet, described herein, and the amount of water discharged from the cathode outlet is used to suitably calculate a target temperature $T_{CO}$ at the cathode outlet. In other further preferred embodiments, since the saturated vapor pressure of water is low at low temperature, the amount of water $W_{CWI}$ supplied to the cathode may preferably be ignored, and thus a process of calculating the amount of water supplied to the cathode and its use may be eliminated. According to preferred exemplary embodiments, like the following calculation formulas, the amount of water supplied to the cathode is calculated based on the water partial pressure at the cathode inlet, which is suitably determined by the atmospheric pressure if there is no humidifier and calculated based on humidifier performance data if there is a humidifier. According to certain exemplary embodiments, since the saturated vapor pressure is generally low at low temperature, the water partial pressure at the cathode inlet may preferably be ignored, and thus the amount of water supplied to the cathode may preferably be ignored.

In further preferred embodiments of the present invention, the controller 300 suitably calculates the amount of water $W_{CW}$ generated in the cathode of the fuel cell stack 100 (S15). Preferably, since the amount of water $W_{CW}$ generated in the cathode of the fuel cell stack 100 is proportional to a stack current $I_S$, the amount of water $W_{CW}$ generated in the cathode by the electrochemical reaction can be calculated based on the stack current $I_S$ detected by the current sensor 102.

In another further preferred embodiment, the controller 300 suitably calculates the amount of heat $Q_S$ generated in the fuel cell stack 100 based on the stack current $I_S$ suitably detected by the current sensor 102 and a stack voltage $V_S$ suitably detected by the voltage sensor 103 (S16). Preferably, since a difference between the stack voltage $V_S$ and a theoretical open circuit voltage (OCV) corresponds to a loss occurring in the fuel cell stack 100 and the loss is converted into heat, the amount of heat $Q_S$ generated in the fuel cell stack 100 can preferably be calculated based on the stack current $I_S$ and the stack voltage $V_S$. The amount of heat $Q_S$ generated in the fuel cell stack 100 preferably is used to calculate a target amount $W_W$ of coolant.

According to further preferred embodiments of the present invention, the controller 300 preferably calculates a target temperature $T_{CO}$ at the cathode outlet, which is preferably used to maintain the humidity in the cathode outlet at 100%, based on the calculated amount of water $W_{CW}$ generated in the cathode (S17). Preferably, in this process, the target temperature $T_{CO}$ at the cathode outlet, which is used to prevent the generation of condensed water in the cathode channel, i.e., to maintain the water present in the cathode in the vapor phase, is calculated based on the amount of water $W_{CW}$ generated in the cathode, a cathode inlet temperature $T_{CI}$ detected by the temperature sensor 223, the cathode gas flow rate $W_C$ (i.e., the amount of air supplied to the cathode) detected by the flowmeter 222, the cathode inlet pressure $P_{CI}$ detected by the pressure sensor 224, and the cathode outlet pressure $P_{CO}$ detected by the pressure sensor 225. According to further preferred embodiments of the present invention, since the cathode outlet pressure can be predicted from the cathode inlet pressure measured by the pressure sensor 224, a control logic, which uses the estimated value obtained from the measured cathode inlet pressure instead of the detection value of the pressure sensor 225, may be suitably configured.

According to further preferred embodiments of the present invention, the controller 300 suitably calculates a target temperature $T_{WO}$ at the coolant outlet based on the calculated target temperature $T_{CO}$ at the cathode outlet (S18). Preferably, since the temperature difference between the coolant and the reactant gases is not large due to the high heat capacity of water, the target temperature $T_{WO}$ at the coolant outlet can preferably be calculated based on the target temperature $T_{CO}$ at the cathode outlet. For example, when the target temperature $T_{CO}$ at the cathode outlet is calculated, a control logic may be suitably configured such that the target temperature $T_{WO}$ at the coolant outlet is suitably determined as an approximate value to the target temperature $T_{CO}$ at the cathode outlet according to a predetermined pattern.

According to further preferred embodiments of the present invention, upon the calculation of the target temperature $T_{WO}$ at the coolant outlet, the controller 300 suitably calculates a target amount of coolant $W_W$ based on the operation state information, such as a coolant inlet temperature $T_{WI}$ detected by the temperature sensor 233 and the amount of heat $Q_S$ generated in the fuel cell stack 100 as well as the target temperature $T_{WO}$ at the coolant outlet, and suitably controls the operation of the water pump 231 based on the calculated target amount $W_W$ of coolant (S19).

According to further preferred embodiments of the present invention, since the amount of heat $Q_S$ generated in the fuel cell stack 100, the coolant inlet temperature $T_{WI}$, the target temperature $T_{WO}$ at the coolant outlet, and the coolant heat capacity are known, the target amount $W_W$ of coolant can preferably be calculated based on such information.

According to further preferred embodiments of the present invention, in order to control the gas temperature at the cathode outlet and the amount of coolant, the controller 300 preferably controls the rotational speed (rpm) of the water pump 231 such that the calculated target amount $W_W$ of coolant can be suitably supplied to the fuel cell stack 100.

Preferably, when the rotational speed (rpm) of the water pump 231 is controlled based on the target amount of coolant $W_W$, the controller 300 refers to the data obtained from a previous test and stored, i.e., the rotational speed of the corresponding water pump (e.g., the amount of coolant vs the rotational speed map data), and controls the operation of the water pump by obtaining the rotational speed (rpm), required to supply the target amount of coolant $W_W$ to the fuel cell stack 100, from the above-mentioned data.

According to other further embodiments of the present invention, in order to control the gas temperature at the cathode outlet of the fuel cell stack 100 by controlling the amount of coolant supplied to the fuel cell stack 100 and the rotational speed of the water pump 231 in the above-described manner, a calculation value required in each step should preferably be calculated. A method for calculating the target temperature at the cathode outlet is described herein with reference to FIG. 4.

According to preferred exemplary embodiments of the present invention, an assumption is that since an anode channel is a dead-ended channel during normal operation, the amount of water that is transferred from the cathode to the anode is preferably ignored.

Figure 4:
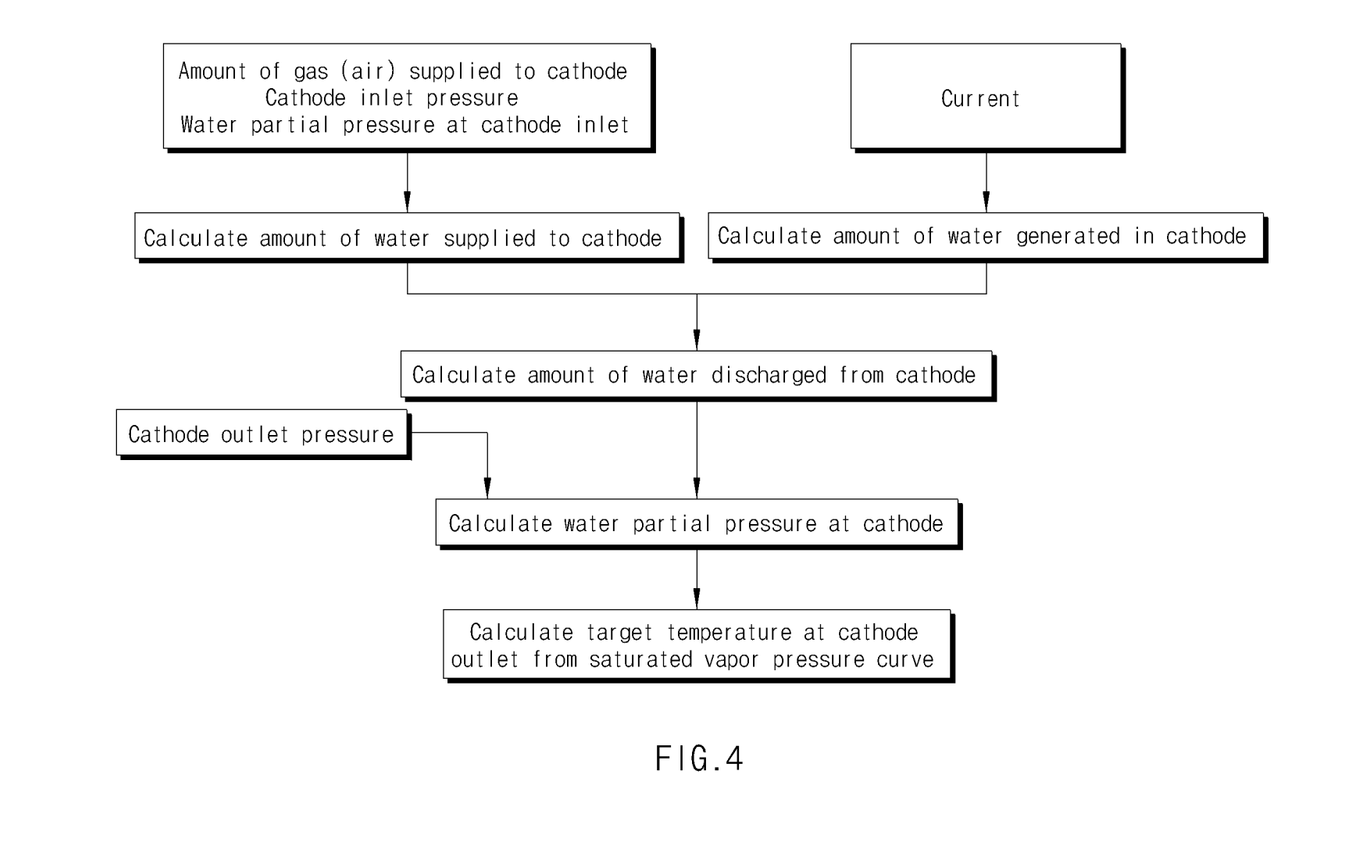
FIG. 4 is a flowchart illustrating a method for calculating a target temperature at a cathode outlet of a fuel cell stack in accordance with the present invention.

In further exemplary embodiments of the present invention, a calculation process of the calculation of the target temperature at the cathode outlet includes calculating the amount of water supplied to the cathode based on the amount of air supplied to the cathode, the cathode inlet pressure, and the water partial pressure at the cathode inlet, a process of calculating the amount of water discharged from the cathode outlet based on the amount of water supplied to the cathode and the amount of water generated from the cathode, a process of calculating the water partial pressure at the cathode outlet based on the amount of water discharged from the cathode outlet and the cathode outlet pressure, a process of calculating the target temperature at the cathode outlet based on the water partial pressure at the cathode outlet from the saturated vapor pressure curve, described herein below.

Symbols used in the formulas are as follows:

$\dot{m}_{w,CA,In}$ represents the amount of water (g/s) supplied to the cathode inlet;

$\dot{m}_{air}$ represents the amount of air (g/s) supplied;

$\dot{m}_{w,CA,Out}$ represents the amount of water (g/s) discharged from the cathode outlet;

$\dot{m}_{O_2,CA,Out}$ represents the amount of oxygen (g/s) discharged from the cathode outlet;

$\dot{m}_{N_2,CA,Out}$ represents the amount of nitrogen (g/s) discharged from the cathode outlet;

$\dot{m}_{w,CA,Gen}$ represents the amount of water (g/s) generated in the cathode;

$\dot{m}_{O_2}^{react}$ represents the amount of oxygen reacted (g/s);

$P_{w,CA,In}$ represents the water partial pressure (kPa) at the cathode inlet;

$P_{CA,In}$ represents the cathode inlet pressure (kPa);

$P_{w,CA,Out}$ represents the water partial pressure (kPa) at the cathode outlet;

$P_{CA,Out}$ represents the cathode outlet pressure (kPa);

$M_w$, $M_{O_2}$, $M_{N_2}$ represents the molar masses (kg/kmol) of water, oxygen, and nitrogen; and $n_{t,Out}$ represents the total molar number at the cathode.

1. According to further preferred embodiments, calculation of the amount of water supplied to the cathode outlet comprises the following.

1-1. Preferably, the amount of water supplied to the cathode outlet is calculated using the cathode gas flow rate ($W_C$ in FIG. 3), the cathode inlet pressure ($P_{CAI}$ in FIG. 3), and the water partial pressure at the cathode inlet ($P_{WCAI}$ in FIG. 3):

$$\dot{m}_{w,CA,In} = \frac{\dot{m}_{air} M_w (P_{w,CA,In})}{M_{air}(P_{CA,In} - P_{w,CA,In})}$$

1-2. Preferably, the amount of water generated in the cathode ($W_{CW}$ in FIG. 3) is calculated based on the applied current ($I = I_S$):

$$\dot{m}_{w,CA,Gen} = \frac{1}{2F} M_w$$

1-3. Preferably, the amount of water discharged from the cathode outlet, which is equal to the sum of the amount of water supplied to the cathode inlet and the amount of water generated in the cathode, is calculated:

$$\dot{m}_{w,CA,Out} = \dot{m}_{w,CA,In} + \dot{m}_{w,CA,Out}$$

2. According to other further preferred embodiments, calculation of the water partial pressure at the cathode outlet using the cathode outlet pressure in the case where all water is in the vapor phase is carried out according to the following formula:

$$P_{w,CA,Out} = \frac{\dot{m}_{w,CA,Out}}{n_{t,Out} M_w} P_{CA,Out}$$

where $n_{t,Out} = \frac{\dot{m}_{w,CA,Out}}{M_w} + \frac{\dot{m}_{O_2,CA,Out}}{M_{O_2}} + \frac{\dot{m}_{N_2,CA,Out}}{M_{N_2}}$ $\dot{m}_{O_2,CA,Out} = 0.21 \times \dot{m}_{air} - \dot{m}_{O_2}^{react}$ $\dot{m}_{N_2,CA,Out} = 0.79 \times \dot{m}_{air}$ 3. In other further preferred embodiments, calculation of the target temperature at the cathode outlet ($T_{CO}$ in FIG. 3) corresponding to the water partial pressure at the cathode outlet obtained from the saturated vapor pressure curve is carried out.

According to further preferred embodiments, when the flow rate of the water pump (the amount of coolant) is controlled in real time using the stack current in the above-described control process of the present invention, the stack current is changed in real time, and thus the amount of coolant should be rapidly changed in real time.

However, since the coolant is a fluid, the response to the flow control is slow, and thus it is impossible to rapidly control the flow of the coolant. Moreover, according to further exemplary embodiments, the consumption power may increase due to an inrush current.

Preferably, when the measured stack current is used as it is in real time without any modification to control the flow rate of the water pump (the amount of coolant), various problems may occur because the stack current is rapidly changed with the lapse of time.

In order to prevent these problems and simplify the control algorithm, according to preferred embodiments of the present invention, it is preferable to use a standard current value, in which the operation state of the fuel cell stack is reflected, as the stack current $I_S$, which is used to calculate the target temperature $T_{CO}$ at the cathode outlet and control the amount of coolant, instead of the stack current measured in real time.

Preferably, according to preferred embodiments of the present invention, the standard current value may be established by one of the following two methods to simplify the process.

According to a preferred embodiment, as the first method, an average value of the stack currents during low-temperature operation may preferably be established as the standard current value. Preferably, since the controller of the fuel cell system continuously receives the stack currents measured during the operation, an accumulated average value of the stack currents input during the low-temperature operation may be used as the standard current value. Preferably, in further embodiments, the stack current is suitably divided into a plurality of sections having a predetermined time interval so as to establish an average value of the currents accumulated from a starting point of the corresponding section, i.e., an accumulated average value of the stack currents, as the standard current.

According to other further embodiments, the controller of the fuel cell system may suitably divide the driving mode of the vehicle during the low-temperature operation so as to establish a current average value of the corresponding driving mode as the standard current.

Preferably, in this method, the standard current is a fixed value, and thus the target temperature of coolant is suitably fixed. Accordingly, as a result, when the coolant inlet temperature is not changed, the target amount of coolant is fixed, thus creating a simple control.

Figure 5:
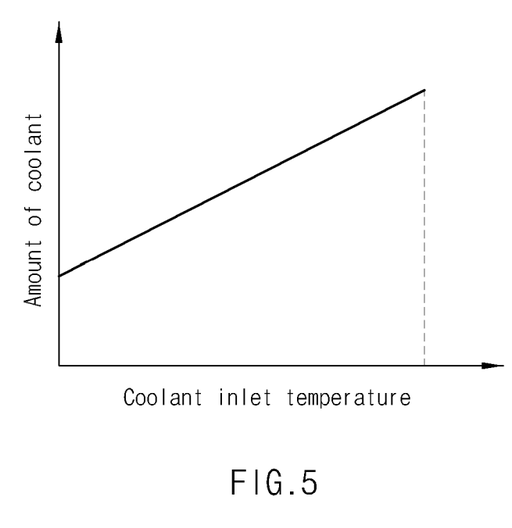
FIG. 5 is a diagram illustrating an example in which a section average value of current values is used as a standard current in accordance with the preferred embodiments of present invention.

According to certain preferred embodiments of the present invention and as shown in FIG. 5, for example, FIG. 5 is a diagram illustrating the section average value of the current values used as the standard current in accordance with the above first method. Preferably, the coolant inlet temperature increases with an increase in the temperature of the fuel cell stack during the low-temperature operation, and thus the target amount of coolant naturally increases before the temperature of the fuel cell stack reaches a normal temperature.

According to other further embodiments, as the second method, an intermediate current value in each current section of the fuel cell stack may be suitably established as the standard current so as to calculate the target amount of coolant.

Preferably, this method is more advantageous when the operation continues at low temperature and high power compared to the first method in which the section average value is suitably established as the standard current. Preferably, in this method, the stack current is suitably divided into a plurality of sections having a predetermined current interval so as to calculate the target amount of coolant based on an intermediate current value of the corresponding section.

For example, in certain preferred embodiments, the stack current is suitably divided into a plurality of sections having a predetermined current interval such as 0 to 50 A, 50 to 100 A such that an intermediate value of 25 A is established as the standard current of the stack current measured in the range of 0 to 50 A and an intermediate value of 75 A is established as the standard current of the stack current measured in the range of 50 to 100 A. Preferably, the thus established standard current is used to calculate the amount of water $W_{CW}$ generated in the cathode, the amount of heat $Q_S$ generated in the fuel cell stack, and the target temperature $T_{CO}$ at the cathode outlet.

Figure 6:
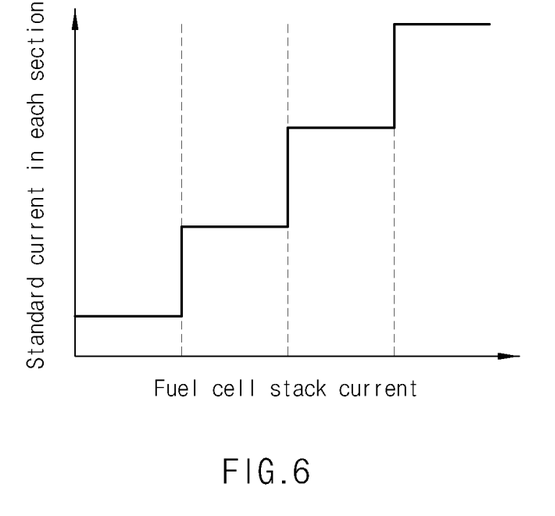
FIG. 6 is a diagram illustrating an example in which an intermediate current value in each current section is used as a standard current in accordance with further preferred embodiments of the present invention.

According to still other exemplary embodiments and as shown in FIG. 6, for example, FIG. 6 is a diagram showing the intermediate current values in each current section used as the standard current in accordance with the above second method.

As described herein, according to the above-described method of the present invention, it is possible to suitably prevent flooding in the fuel cell stack during low-temperature operation, and thus it is possible to improve the operation stability and durability of the fuel cell stack. Further, according to preferred embodiments of the present invention, it is possible to suitably reduce the amount of water condensed in the cathode channel, and thus it is possible to suitably ensure the cold startability during the winter season.

Further, according to the present invention as described herein, since the average operation temperature of the fuel cell stack is suitably increased during low-temperature operation, it is possible to suitably increase the output power of the fuel cell stack and reduce the energy loss compared to the conventional method of using the energy generated in the fuel cell stack as heat energy to increase the temperature of the fuel cell stack using the loads connected in parallel to the fuel cell stack.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for controlling the operation of a fuel cell system at low temperature, the method comprising:
    determining, by a controller, whether the temperature of a fuel cell stack reaches a normal temperature;
    calculating, by the controller, when it is determined that the temperature of the fuel cell stack is lower than the normal temperature, a target temperature at a cathode outlet to maintain water present in a cathode of the fuel cell stack in a vapor phase based on information related to an operation state of the fuel cell stack detected by an operation state detection means; and
    calculating, by the controller, a target amount of coolant based on the calculated target temperature at the cathode outlet and the information related to the operation state of the fuel cell stack, and controlling the amount of coolant supplied to the fuel cell stack based on the calculated target amount of coolant,
    wherein the target temperature at the cathode outlet is calculated based on the information related to the operation state of the fuel cell stack including the amount of water generated in the cathode, which is calculated based on a stack current, the amount of air supplied to the cathode, and cathode inlet and outlet pressures,
    wherein the target amount of coolant is calculated based on the information related to the operation state of the fuel cell stack including a target temperature at a coolant outlet, which is obtained from the calculated target temperature at the cathode outlet, a coolant inlet temperature, and the amount of heat generated in the fuel cell stack.

2. The method of claim 1, wherein the calculation of the target temperature at the cathode outlet comprises:
    calculating the amount of water supplied to the cathode based on the amount of air, the cathode inlet pressure, and a water partial pressure at the cathode inlet;
    calculating the amount of water discharged from the cathode based on the amount of water supplied to the cathode and the amount of water generated in the cathode;
    calculating a water partial pressure at the cathode outlet based on the amount of water discharged from the cathode and the cathode outlet pressure; and
    calculating a target temperature at the cathode outlet based on the water partial pressure at the cathode outlet obtained from a saturated vapor pressure curve.

3. The method of claim 1, wherein the target temperature at the cathode outlet is calculated based on the information related to the operation state of the fuel cell stack including the amount of water generated in the cathode, which is calculated based on a stack current, the amount of air supplied to the cathode, and the cathode output pressure.

4. The method of claim 3, wherein the calculation of the target temperature at the cathode outlet comprises:
    calculating the water partial pressure at the cathode outlet based on the amount of water discharged from the cathode, which is used as the amount of water generated in the cathode, and the cathode outlet pressure; and
    calculating the target temperature at the cathode outlet based on the water partial pressure at the cathode outlet obtained from the saturated vapor pressure curve.

5. The method of claim 1, wherein the amount of heat generated in the fuel cell stack is calculated from stack current and voltage.

6. The method of claim 1, wherein the control of the amount of coolant supplied to the fuel cell stack comprises controlling the rotational speed of a water pump such that the calculated target amount of coolant is supplied to the fuel cell stack.

7. The method of claim 1, wherein the stack current is divided into a plurality of sections having a predetermined time interval or driving mode such that a current average value obtained in the corresponding section is used.

8. The method of claim 1, wherein the stack current is divided into a plurality of sections having a predetermined current interval such that an intermediate current value in the corresponding section to which a current value measured in real time belongs is used.

9. A method for controlling the operation of a fuel cell system at low temperature, the method comprising:
    determining, by a controller, the temperature of a fuel cell stack;
    in response to determining that the temperature of the fuel cell stack is lower than a normal temperature, calculating, by the controller, a target temperature at a cathode outlet to maintain water present in a cathode of the fuel cell stack in a vapor phase based on information related to an operation state of the fuel cell stack; and
    calculating, by the controller, a target amount of coolant based on the calculated target temperature at the cathode outlet and the information related to the operation state of the fuel cell stack, and controlling the amount of coolant supplied to the fuel cell stack based on the calculated target amount of coolant.

10. The method of claim 9, wherein determining the temperature includes determining whether the temperature of a fuel cell stack reaches a normal temperature.

11. The method of claim 9, wherein the calculating is performed upon determining that the temperature of the fuel cell stack is lower than the normal temperature.

12. The method of claim 9, wherein information comprising an operation state of the fuel cell stack is detected by an operation state detection means.

* * * * *